United States Patent [19]

Majima et al.

[11] Patent Number: 5,505,629

[45] Date of Patent: Apr. 9, 1996

[54] BATTERY RETAINING SYSTEM

[75] Inventors: Takahiko Majima, Tsuna; Takeji Furuichi, Mihara, both of Japan

[73] Assignee: Sanyo Electric Co., Ltd., Osaka, Japan

[21] Appl. No.: 276,467

[22] Filed: Jul. 18, 1994

[30] Foreign Application Priority Data

Jul. 19, 1993 [JP] Japan ................................. 5-039312 U
Dec. 6, 1993 [JP] Japan ................................. 5-065051 U

[51] Int. Cl.⁶ .................................................. H01R 23/68
[52] U.S. Cl. ..................... 439/78; 439/500; 439/83
[58] Field of Search ......................... 439/78, 5 W, 83, 439/876; 429/96, 95, 100, 123, 178

[56] References Cited

U.S. PATENT DOCUMENTS

| | | | |
|---|---|---|---|
| 4,495,257 | 1/1985 | Engelstein et al. | 429/178 |
| 4,594,777 | 6/1986 | Kimoto et al. | 30/42 |
| 4,977,042 | 12/1990 | Chizajo et al. | 429/100 |
| 5,380,602 | 1/1995 | Kato et al. | 429/123 |

FOREIGN PATENT DOCUMENTS

| | | |
|---|---|---|
| 58-8866 | 1/1983 | Japan . |
| 58-7467 | 1/1983 | Japan . |
| 59-137086 | 8/1984 | Japan . |
| 63-46074 | 3/1988 | Japan . |
| 3-33924 | 4/1991 | Japan . |

OTHER PUBLICATIONS

Technical Digest #45, Jan. 1977, p. 35, Western Electric.

*Primary Examiner*—Gary F. Paumen
*Assistant Examiner*—T. C. Patel
*Attorney, Agent, or Firm*—Wenderoth, Lind & Ponack

[57] ABSTRACT

The battery retaining system has a printed circuit board, a battery, and contact fittings. L-shaped contact fittings soldered to the backside of the circuit board hold battery electrode conducting tabs through slits in the circuit board. The battery is solidly retained with reliable electrical contact while minimizing the use of circuit board area. Spent batteries which are harmful to the environment can be easily removed and recycled.

10 Claims, 3 Drawing Sheets

BATTERY RETAINING SYSTEM

BACKGROUND OF THE INVENTION

This invention relates to a system for retaining a battery on a printed circuit board inside battery driven electrical equipment such as an electric razor.

Many compact electrical devices, such as the electric razor, which are powered by dry cells or rechargeable batteries have been known for some time. Electrical equipment driven by dry cell batteries are provided with a battery compartment allowing battery installation and removal to facilitate spent battery exchange. On the other hand, electrical equipment driven by rechargeable batteries are often assembled with internal rechargeable batteries, a rechargeable battery charging circuit, and AC plug blades for connecting to commercial power as a source of power for charging. This is done because rechargeable batteries can be used repeatedly with recharging. When rechargeable batteries in this type of electrical equipment become discharged as a result of driving the load, they can be recharged by inserting the AC plug blades into an electrical outlet without removing the batteries from inside the electrical equipment. Recharging renews the batteries to full charge able to again drive the electrical equipment. In this manner, since rechargeable batteries can be used repeatedly, there is no need to exchange batteries, no need to install or remove batteries, and the batteries can be permanently built-in to the electrical equipment. Therefore, the electrical equipment is easy to use and its structure is simplified since no battery compartment is required.

FIG. 1 shows an oblique view of a rechargeable battery with conducting tabs 2 welded to its electrode regions, and FIG. 2 shows an oblique view of a rechargeable battery mounted on a printed circuit board. Part number 1 is a rechargeable nickel cadmium battery. This battery 1 is provided with a positive (+) and negative (−) electrode region, and a conducting tab 2 is spot welded to each electrode region. As mentioned previously, when the nickel cadmium battery is used in electrical equipment such as an electric razor, there is no need to remove or replace the battery 1 inside the electrical equipment. Therefore, the conducting tabs 2 can be soldered directly to the printed circuit board 3 housed within the electrical equipment. The conducting tabs 2 are made for the purpose of soldering to a printed circuit board 3. Space on the printed circuit board 3 is allocated for the battery 1 and slits 4 through the board are provided for the conducting tabs 2 at both ends of the battery. The conducting tabs 2 of the battery 1 are inserted into the slits 4 of the printed circuit board 3 and the battery 1 is retained on the top of the printed circuit board. The conducting tabs 2 are bent over on the reverse side of the printed circuit board 3 and soldered to the surface of the board. In this fashion the battery 1 is fixed to the printed circuit board 3 and housed within the electrical equipment.

However, in recent years rechargeable batteries such as nickel cadmium batteries that have exceeded their lifetime and become non-functional, have been separated from other discarded waste and recycled to protect the environment. However, as shown in FIG. 2, a nickel cadmium battery 1 soldered to a printed circuit board 3 cannot be removed without using a special tool such as fine tipped diagonal cutters to cut the conducting tabs 2. For this reason, recovery of only the nickel cadmium batteries 1 is an extremely difficult problem.

This problem can be solved by providing a battery compartment that allows insertion and removal of batteries in the same manner as prior art electrical equipment powered by dry cell batteries. However, a removable dry cell battery compartment requires a structure to accurately retain batteries in proper position and spring-loaded contacts to press against the electrodes of the properly positioned batteries. To retain batteries in their proper positions, it is necessary to surround them with wall-like structures. Battery compartments of many electrical devices have battery cases or enclosures in which the batteries are retained in their specified positions. For this reason, a large amount of the electrical equipment space must be devoted to the battery compartment region and compact design is made difficult. Furthermore, the removable dry cell battery compartment has the drawback that electrical contact problems arise easily between the spring-loaded contacts and the battery electrodes. Strengthening the pressure of the spring-loaded contacts against the electrodes is effective in reducing contact problems. However, this makes insertion and removal of the dry cell batteries difficult. Further, when both battery electrodes are strongly pressed on by spring-loaded contacts, the batteries are easily dislodged from their specified battery case positions causing contact problems.

The object of present invention is to solve the previously mentioned problems by offering a battery retaining system that provides reliable electrical contact and reliable printed circuit board (or other structure) attachment for a battery housed internally in an electrical apparatus, and in addition makes the battery easily removable.

SUMMARY OF THE INVENTION

The battery retaining system of this invention is configured as follows to achieve the above mentioned object. The battery retaining system comprises a printed circuit board, a battery disposed on tell of the printed circuit board, and a pair of contact fittings to both retain the battery on the printed circuit board and make electrical contact between the battery and the printed circuit board. Conducting tabs are spot welded to both of the battery electrodes. Tile contact fittings have a solder section that is soldered to the printed circuit board and a connector section that holds a conducting tab. The contact fittings are bent between the solder section and the connector section to form an L-shape.

DETAILED DESCRIPTION OF THE INVENTION

Figure 1:
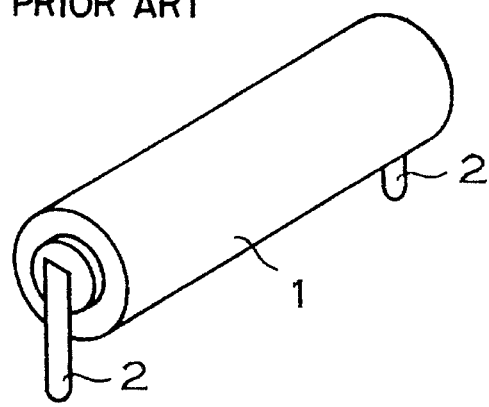
FIG. 1 is an oblique view of a rechargeable battery.
Figure 2:
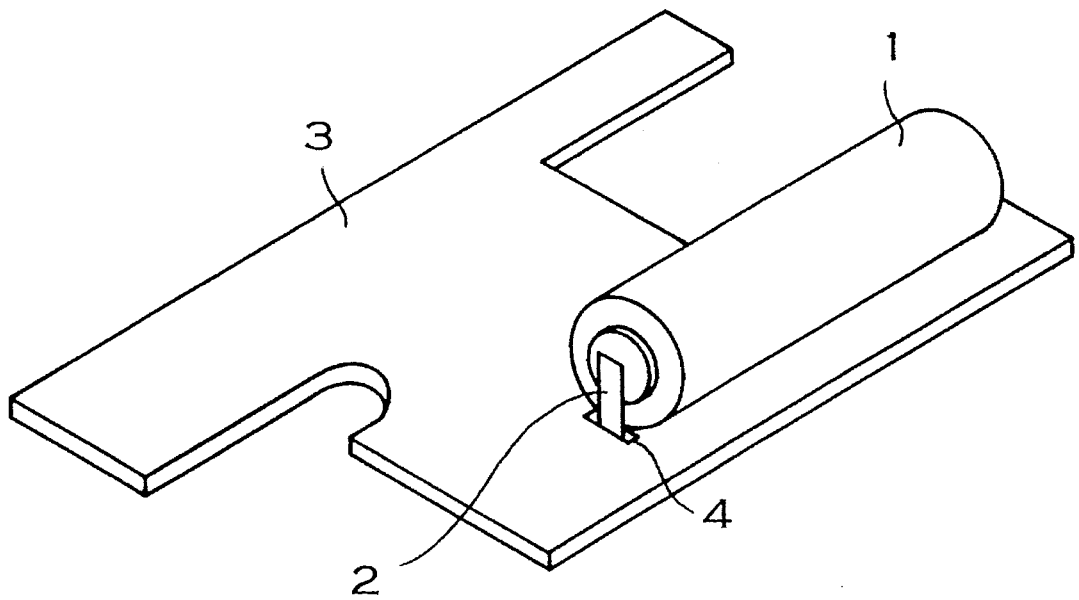
FIG. 2 is an oblique view of a prior art printed circuit board with the rechargeable battery shown in FIG. 1 attached.

The battery retaining system of this invention comprises a printed circuit board, a battery, and contact fittings. The battery is held in a fixed position on the printed circuit board and electrically connected to the circuit board via the contact fittings and conducting tabs welded to the battery electrodes. A contact fitting has an overall L-shape with one part of the L forming a solder section which is soldered to the printed circuit board and the other part of the L forming a connector section which holds a conducting tab.

Further, it is preferable for the printed circuit board off the battery retaining system of this invention to be provided with slits positioned corresponding to the electrode regions of the attached battery. The solder section of the contact fitting is soldered to the backside of the printed circuit board and the connector section passes through the slit from the backside projecting out the front-side of the printed circuit board.

The connector section of the contact fitting is provided with flanges to sandwich the edges of a conducting tab for reliable retention and electrical connection, and a tongue to push the conducting tab against the flanges.

The solder section of the contact fitting is provided with a solder stop to prevent solder from flowing towards the connector section near the bend between the solder section and the connector section.

Since the contact fitting for this type of battery retaining system is bent in an L-shape between the solder section and the connector section, the solder section aligns with a printed circuit board for easy soldering and the connector section stands perpendicular to the printed circuit board with a construction that sandwiches a conducting tab, which is spot welded to a battery electrode, making it easy to hold the battery. Since the battery is held between one pair of contact fitting connector sections, it can be easily removed.

Further, since the contact fitting solder section is passed through a printed circuit board slit and soldered to the backside, the space saved by not soldering it to the front-side can be allocated for disposition of other circuit elements or materials. The interior walls of a printed circuit board slit also serve to prevent excessive bending of the connector section and hold the connector section upright at an angle nearly perpendicular to the printed circuit board.

Since the connector section flanges sandwich the conducting tab edges and the tongue pushes the conducting tab against the flanges, another level of battery retention reliability is added and good contact is established between the conducting tab and the connector section. The connector section flanges also serve the additional function of reinforcing and preventing collapse of the connector section which stands nearly perpendicular with respect to the printed circuit board.

The solder stop formed on the solder section prevents solder flowing on top of the solder section during solder attachment of the contact fitting to the printed circuit board from reaching the bend to the connector section. For example, in the case of solder stop cut-outs shown in FIG. 5, the channel for solder to flow towards the connector section is narrowed causing an amount of solder corresponding to the amount of narrowing to flow elsewhere. This results in a reduction in the amount of solder flowing towards the connector section. Consequently, solder flows along the top of the contact fitting, but the solder stop serves to stem the flow. Thereby solder is not allowed to flow to the connector section in which the conducting tab is inserted, and conducting tab insertion is not obstructed.

Figure 3:
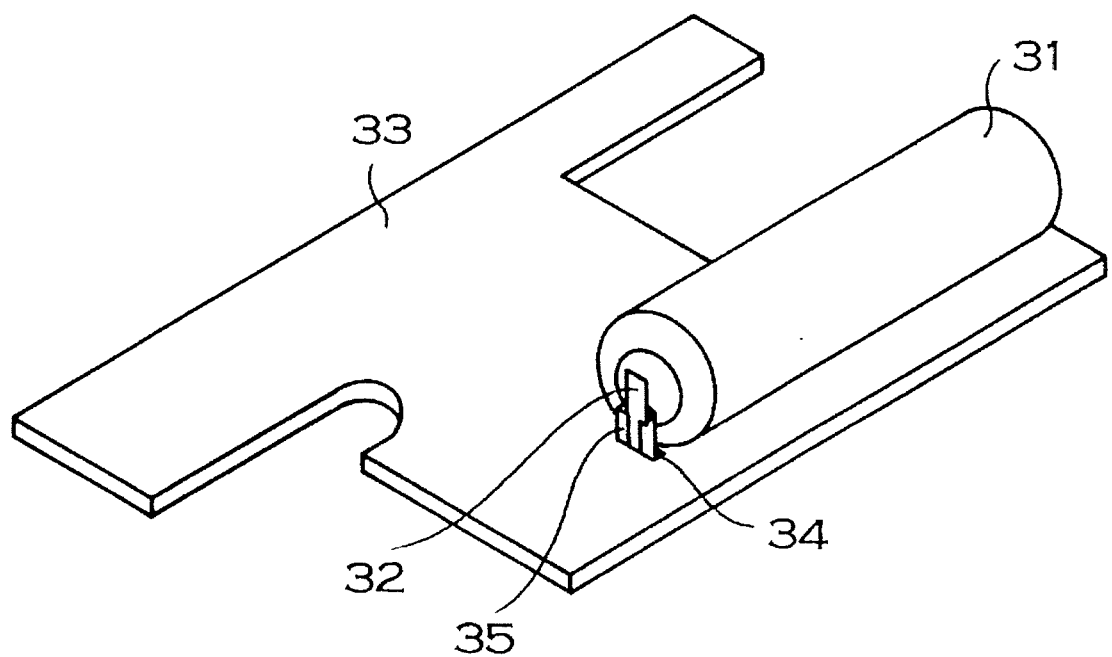
FIG. 3 is an oblique view of a printed circuit board with a rechargeable battery attached employing the present invention.

The first embodiment of this invention is described below based on FIGS. 1, 3, and 4. Component parts in these figures that are the same as previously described prior art parts are numbered with the final digit in common. As previously described, FIG. 1 shows a nickel cadmium battery 1 with conducting tabs 2 spot welded to the electrode regions at both ends. FIG. 3 shows a printed circuit board 33 with slits 34 through the board positioned to correspond to both ends of the battery 31.

Figure 4:
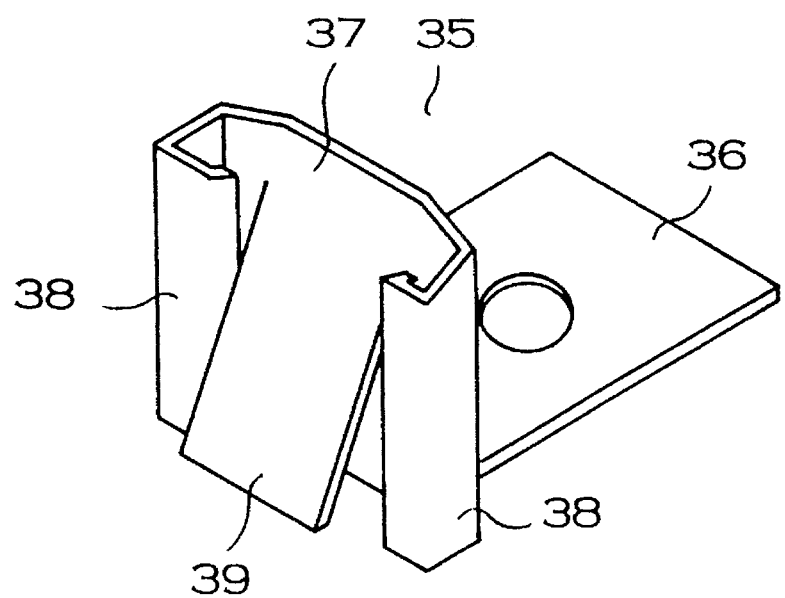
FIG. 4 is an enlarged oblique view of a contact fitting of the present invention.

Turning to FIG. 4, an L-shaped contact fitting 35 is shown. The contact fitting 35 is bent between the solder section 36 and the connector section 37. Both sides of the connector section 37 are wrapped around to form flanges 38, and a tongue 39 having spring-action is formed at the center of the connector section 37. As shown in FIG. 4, the width of the tongue 39 is made narrower than the gap between the flanges 38. This allows the tongue 89 to project out beyond the flanges 38 when a conducting tab is not inserted (as illustrated). The purpose of this is to provide strong pressure against the conducting tab when it is inserted.

In a contact fitting 35 with tills structure, the solder section 36 is positioned on the backside of the printed circuit board and the connector section 37 passes through the slit 34 to stand out From the front-side of the printed circuit board 33 as shown in FIG. 3. The solder section 36 is soldered to the backside of the printed circuit board 33. As a result the connector section 37 stands nearly perpendicular relative to the printed circuit board 33. Next, as shown in FIG. 3, the conducting tabs 32 of the nickel cadmium battery 31 are inserted into the connector sections 37 such that they are sandwiched by the flanges 38. At this time, the spring-action of the tongue 39 pushes the conducting tab 32 against the flanges 38. This solidly retains the battery 31 and simultaneously assures good contact between the conducting tab 32 and the connector section 37.

Figure 5:
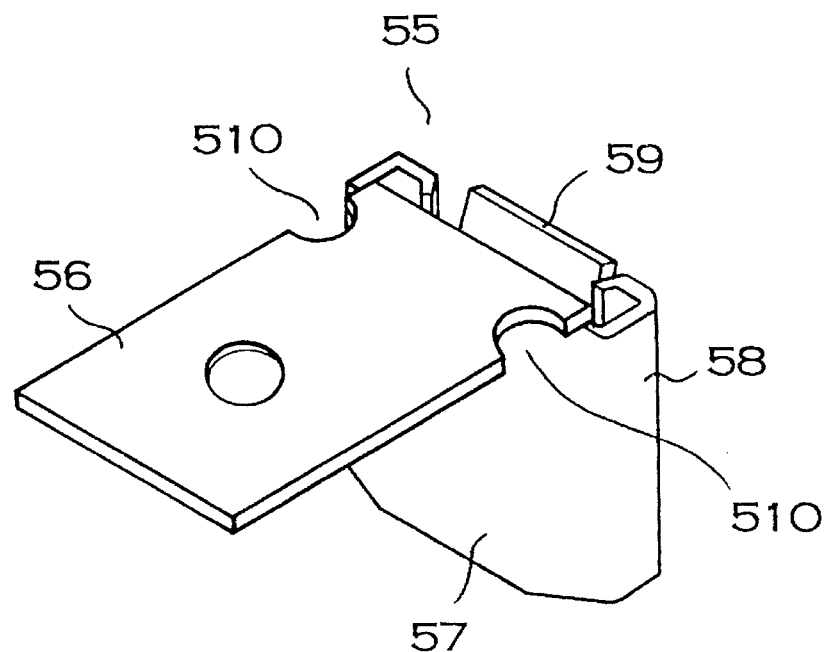
FIG. 5 is an enlarged oblique view of a preferred contact fitting of the present invention.
Figure 6:
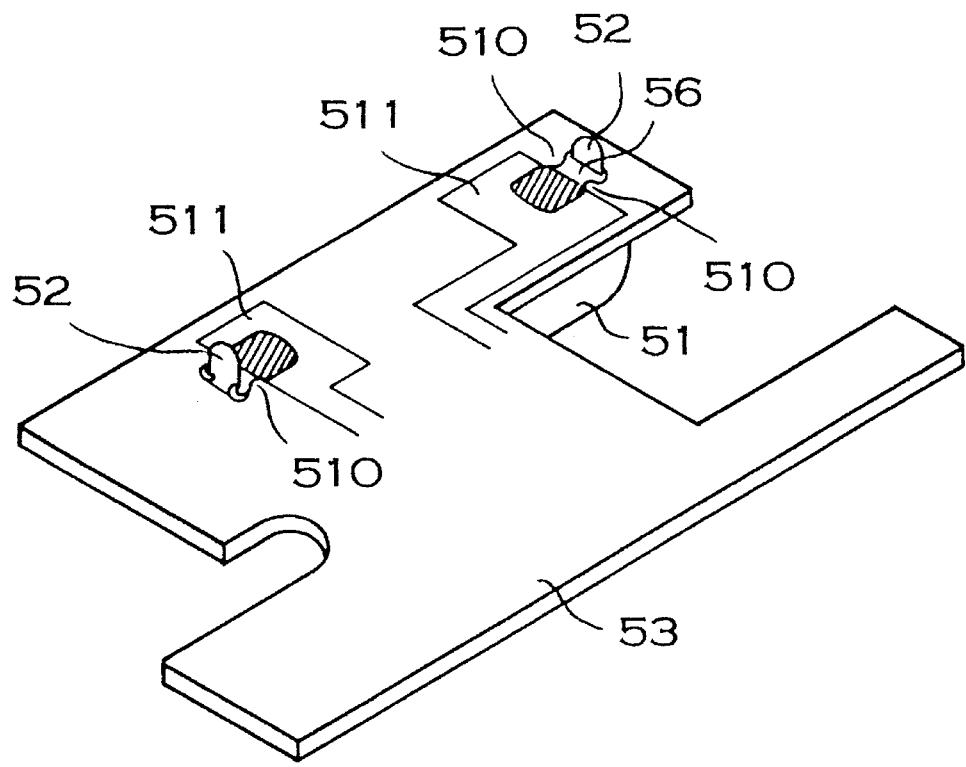
FIG. 6 is an oblique view of the contact fittings of FIG. 5 soldered to a printed circuit board.

Turning to FIGS. 5 and 6, a further preferred embodiment of the present invention is shown. FIG. 5 shows a contact Fitting 55, which is an improved version of the contact Fitting 35 of FIG. 4, and which is shown in an inverted position relative to FIG. 4. Namely, in the contact fitting 55 shown in FIG. 5, cut-outs 510 are formed to narrow the solder section 56 near the bend to the connector section 57. These cut-outs 510 serve as a solder stop. As shown in FIG. 6, during soldering of the contact fitting to the printed circuit board 53, the solder flow channel towards the connector section is narrowed and an amount of solder corresponding to this width reduction extends its flow in a different direction. The amount of solder flow towards the connector section is thereby reduced. Consequently, solder flows along the surface of the contact fitting, but the solder stop serves to check the flow. As a result excess solder is prevented From Flowing towards the slit where the conducting tab 52 is inserted, and therefore insertion of the conducting tab 52 is not obstructed by excess solder.

Conducting metalization runs 511 on the printed circuit board 53 are patterned to extend precisely to the cut-outs 510. For this reason, printed circuit board 53 insulating material rather than conducting metalization 511 is positioned under the cut-outs 510. Therefore, when a solder section 56 is soldered to a conducting metalization run 511, the solder stops before reaching the cut-outs 510.

The solder stop to prevent solder from flowing to the connector section 57 may be edge cut-outs as described in the preferred embodiment or a hole provided through the center region. Solder flow may also be stopped by providing a height difference on the solder section 56 elevating the connector section.

Since the contact fitting of a battery retaining system with the previously described structure is bent in an L-shape between the solder section and the connector section, the solder section lies along the printed circuit board for easy soldering. Furthermore, the connector section stands perpendicular to the printed circuit board with a construction that sandwiches the spot welded battery conducting tab making it easy to hold the battery. Since the system holds the battery between a pair of contact fitting connector sections, it can be easily removed.

Further, since the solder section of a contact fitting is passed through a printed circuit board slit and soldered to the backside, the extra space saved by not soldering it to the front-side can be allotted to other circuit elements or materials. The side walls of a slit in the printed circuit board also serve to prevent the connector sect ion from bending excessively and hold the connector section upright at an angle nearly perpendicular to the printed circuit board.

Still further, since the connector section flanges sandwich the edges of a conducting tab and the tongue pushes the conducting tab against the flanges, time battery is held in a highly reliable fashion arid good contact is established between the conducting tab and the connector section. The connector section flanges also serve to reinforce and prevent the collapse of the connector section which stands nearly perpendicular with respect to the printed circuit board. This allows stable long term battery retention and electrical contact.

Finally, during attachment of the contact fitting to the printed circuit board, the solder stop provided on the solder section prevents solder flowing on the surface of the solder section from reaching the bend to the connector section. For example, in the case of the solder stop cut-outs shown in FIG. 5, the channel for solder to flow towards the connector section is narrowed causing solder to flow elsewhere reducing the amount of solder flowing towards the connector section. Consequently, solder flows along the contact fitting, but the solder stop cuts off the flow. Therefore, solder cannot flow to the connector section where the conducting tab is inserted, and this results in unhindered conducting tab insertion.

This type of battery retaining system allows easy battery removal, and in addition insures reliable electrical contact between the battery and the printed circuit board and reliable battery attachment to the printed circuit board. This invention makes a positive contribution to preserving the environment by allowing spent batteries to be removed and recycled without introducing the possibility of electrical equipment operation failure.

What is claimed is:

1. A battery retaining system comprising:
   (a) a printed circuit board;
   (b) a battery disposed on the printed circuit board, and having a pair of electrode regions with a conducting tab spot welded to each electrode region; and
   (c) a pair of contact fittings each having a solder section soldered to the printed circuit board and a connector section holding a respective one of the conducting tabs, and wherein the contact fittings are bent between the solder section and the connector section to form an L-shape.

2. A battery retaining system as recited in claim 1 wherein the battery is a rechargeable battery.

3. A battery retaining system as recited in claim 2 wherein the battery is a nickel cadmium battery.

4. A battery retaining system as recited in claim 1 wherein the printed circuit board has a pair of slits positioned to correspond to the electrode regions of the attached battery, and the solder section of each contact fitting is soldered to the backside of the printed circuit board while the connector section passes through the printed circuit board to project out from the backside towards the front-side of the printed circuit board.

5. A battery retaining system as recited in claim 1 wherein the connector section of the contact fitting is provided with flanges to sandwich the side edges of the conducting tab and a tongue to push the conducting tab against the flanges.

6. A battery retaining system as recited in claim 5 wherein the width of the tongue is made narrower than the space between the flanges.

7. A battery retaining system as recited in claim 1 wherein the solder section of the contact fitting is provided with a solder stop near the bend to prevent solder from flowing towards the connector section.

8. A battery retaining system as recited in claim 7 wherein the solder stop comprises cut-outs that narrow the solder section near the bend in the contact fitting.

9. A battery retaining system as recited in claim 7 wherein the solder stop comprises an opening in the center region of the solder section.

10. A battery retaining system as recited in claim 7 wherein the solder stop comprises a height difference along the solder section.

\* \* \* \* \*